[19] United States Patent
Graham

[11] Patent Number: 5,988,359
[45] Date of Patent: Nov. 23, 1999

[54] VIBRATORY DRIVE UNIT AND ASSOCIATED PARTS FEEDER BOWL

[76] Inventor: S. Neal Graham, 12997 Fawns Ridge, Fishers, Ind. 46038

[21] Appl. No.: 08/806,019

[22] Filed: Feb. 24, 1997

[51] Int. Cl.$^6$ .................................................. B65G 27/08
[52] U.S. Cl. ........................................... 198/763; 198/757
[58] Field of Search .................................. 198/757, 769, 198/763

[56] References Cited

U.S. PATENT DOCUMENTS

| | | |
|---|---|---|
| 2,985,280 | 5/1961 | Burgess, Jr. . |
| 3,128,874 | 4/1964 | Hanna ..................... 198/757 |
| 3,258,111 | 6/1966 | Spurlin et al. . |
| 3,473,759 | 10/1969 | Spiess ..................... 198/757 |
| 3,587,833 | 6/1971 | Byrum et al. . |
| 3,655,032 | 4/1972 | Willis . |
| 3,658,172 | 4/1972 | Hacker . |
| 3,680,683 | 8/1972 | Lebreuil ................... 198/757 |
| 3,700,094 | 10/1972 | Parr . |
| 3,788,449 | 1/1974 | Baberowski et al. ....... 198/757 |
| 3,917,052 | 11/1975 | Burgess, Jr. ............... 198/757 |
| 4,181,216 | 1/1980 | Cipu . |
| 4,909,379 | 3/1990 | Albeck et al. . |
| 5,314,058 | 5/1994 | Graham . |
| 5,404,995 | 4/1995 | Graham . |
| 5,445,261 | 8/1995 | Kimura ..................... 198/763 |
| 5,518,108 | 5/1996 | Spurlin . |
| 5,611,423 | 3/1997 | Graham ..................... 198/757 |
| 5,813,517 | 9/1998 | Logeman et al. ........... 198/759 |

FOREIGN PATENT DOCUMENTS

| | | | |
|---|---|---|---|
| 3600334 | 7/1986 | Germany .................. 198/757 |
| 63-41306 | 2/1988 | Japan ....................... 198/757 |
| 1070090 | 1/1984 | U.S.S.R. .................. 198/757 |
| 1393721 | 5/1988 | U.S.S.R. .................. 198/757 |

*Primary Examiner*—James W. Keenan
*Assistant Examiner*—Thuy V. Tran
*Attorney, Agent, or Firm*—Woodard, Emhardt, Naughton, Moriarty & McNett Patent and Trademark Attorneys

[57] ABSTRACT

A vibratory drive unit is modular in construction and includes a base member, a top member, a number of lower spring mounting members detachably mounted to the base member, a corresponding number of upper spring mounting members detachably mounted to the top member, a corresponding number of spring members connected between the number of upper and lower spring mounting members and means for vibrating the top member relative to the base member. The various components of the vibratory drive unit are configured provide for either clockwise or counter-clockwise operation using identical drive unit components to thereby minimize component complexity and component inventory required therefore. A vibratory bowl is further provided and includes a number of locator pins extending from a bottom surface thereof. Each of the locator pins are received within a corresponding recess defined in the top member of the vibratory drive unit and attachment is made therebetween to secure the vibratory bowl to the top member of the vibratory drive unit.

21 Claims, 9 Drawing Sheets

VIBRATORY DRIVE UNIT AND ASSOCIATED PARTS FEEDER BOWL

FIELD OF THE INVENTION

The present invention relates generally to parts feeding and sorting apparatuses, and more specifically to such apparatuses including a parts feeder bowl mounted to a vibratory drive unit.

BACKGROUND OF THE INVENTION

Vibratory parts feeders are commonly known apparatuses for providing oriented parts from a mass of disoriented parts, for transporting parts along a processing path, and/or for feeding and maintaining a predetermined quantity of parts to a downstream parts orienting feeder. A common requirement of any of the foregoing parts feeders is a drive unit operable to impart the necessary vibratory feed motion to a parts container operatively associated with the drive unit.

In accordance with one known class of vibratory parts feeders, a vibratory bowl is mounted to a suitable drive unit wherein the drive unit is typically operable to urge parts upwardly along a helical parts path of the bowl by vibrating the bowl both axially along, and rotationally about, its central axis. In the design of such a vibratory parts feeder, an established industry practice is to attach the feeder bowl to a top member of the drive unit, wherein the top member and a stationary base member of the drive unit are interconnected by a plurality of drive springs. Vibratory action is created at the base member, by suitable means, which is transferred to the top member via the drive springs. By establishing an appropriate vibratory direction, and properly positioning the drive springs accordingly, the feeder bowl is made to vibrate in either an upwardly clockwise or upwardly counter-clockwise direction. Parts within the feeder bowl are then correspondingly transported upwardly along the helical parts path to a bowl exit location.

Figure 1:
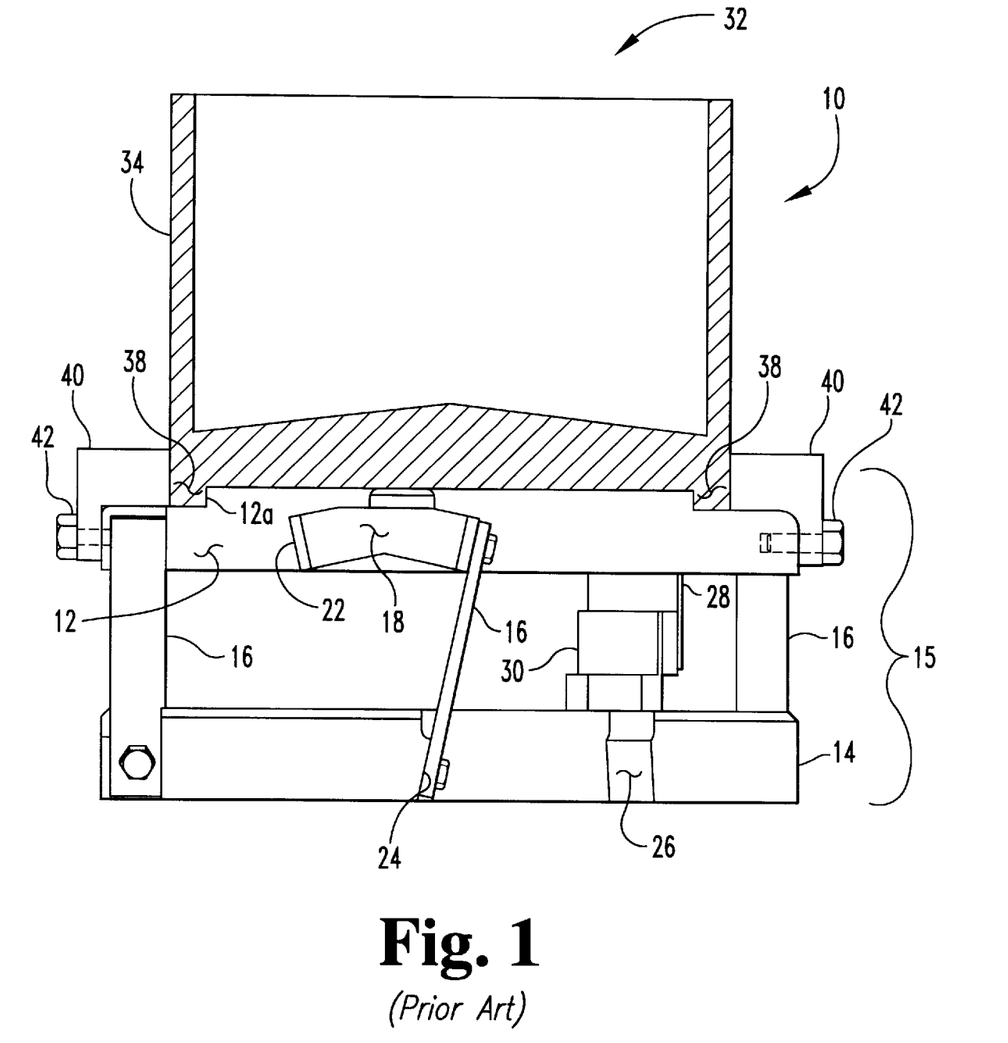
FIG. 1 is a front elevational view, in partial cross-section, of a known vibratory drive unit and feeder bowl mounting arrangement.

An example of one known vibratory drive unit 15 for use with a vibratory parts feeder 10 is shown in FIG. 1. Referring to FIG. 1, vibratory drive unit 15 includes a top member 12 connected to a bottom member 14 via a number of drive springs 16. Top member 12 includes a number of spring mounting members 18 formed integrally therewith, which members typically include opposing spring mounting faces 20 and 22. Bottom member 14 defines corresponding spring mounting faces 24 and 26 therein. Springs 16 are mounted between spring mounting faces 20 of top member and spring mounting faces 24 of bottom member 14, as shown in FIG. 1, for vibration of top member 12 relative to bottom member 14 in an upward clockwise direction. Springs 16 may alternatively be connected between spring mounting faces 22 of top member 12 and spring mounting faces 26 of bottom member 14 for rotation of top member 12 relative to bottom member 14 in an upward counter-clockwise direction. In so doing, vibratory drive unit 15 typically includes a striker plate 28 connected to top member 12, and an electromagnetic driver 30 mounted to bottom member 14. Electromagnetic driver 30 is typically periodically energized to attract striker plate 28 thereto, thereby imparting the vibratory drive motion to top member 12 through springs 16 as is known in the art.

While the foregoing vibratory drive unit structure is widely used and satisfactorily provides for bi-directional operation thereof, it has several drawbacks associated therewith. For example, spring mounting faces 20, 22, 24 and 26 are formed integrally with top member 12 and bottom member 14 respectively. Typically, such spring mounting faces have a bore therethrough for engaging a fastener used to mount springs 16 thereto. If any damage occurs to faces 20–26, or the bores defined therein, either due to accident or normal wear and tear, the entire top member 12 or bottom member 14 must be replaced for continued operation of vibratory drive unit 15. Such replacement can be costly and wasteful, particularly if only one spring mounting face, or bore, is damaged, and the remaining spring mounting faces and corresponding bores are in good condition. As another example, providing vibratory drive unit 15 with bi-directional operation requires the number of spring mounting faces of top member 12 and bottom member 14 to be doubled over that required for uni-directional operation. Such a requirement adds significantly to the processing time and costs of fabricating top member 12 and bottom member 14.

Designers of vibratory parts feeders have utilized several approaches in attaching a feeder bowl to a vibratory drive unit, such as drive unit 15. One such prior art approach is shown with respect to vibratory parts feeder 10 of FIG. 1. Referring to FIG. 1, a feeder bowl 32 is attached to the top member 12 of vibratory drive unit 15 via a number of clamp nuts 40. Vibratory bowl 32 includes a side wall portion 34 which extends downwardly beyond bottom bowl surface 36, thereby defining a flange portion 38. Fasteners 42 extend through clamp nuts 40 into top member 12 to thereby secure flange portion 38 between a vertical wall 12a of top member 12 and clamp nuts 40.

Figure 2:
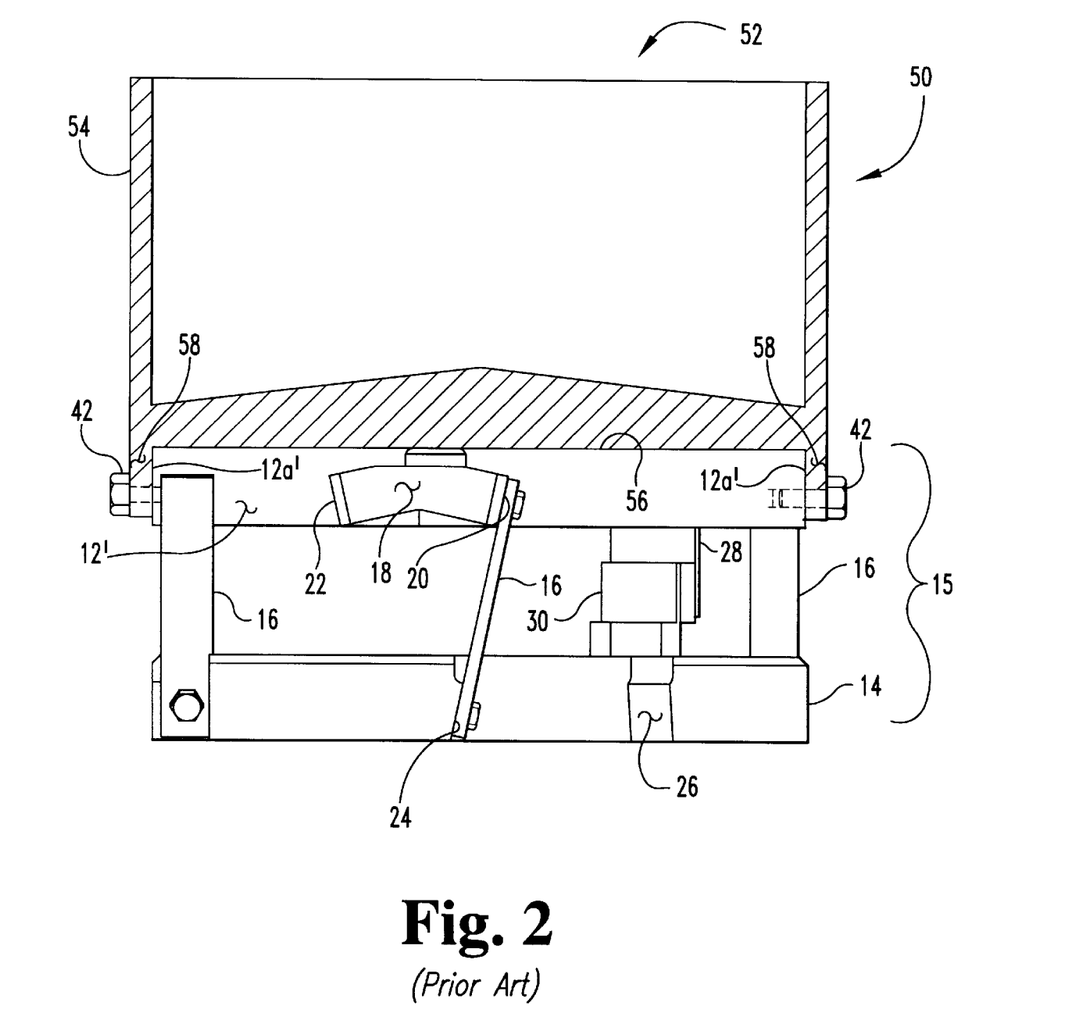
FIG. 2 is a front elevational view, in partial cross-section, of the vibratory drive unit of FIG. 1 showing a known alternate technique for mounting a feeder bowl thereto.

Yet another known approach for attaching a feeder bowl to a vibratory drive unit is shown with respect to vibratory parts feeder 50 of FIG. 2. Referring to FIG. 2, vibratory bowl 52 is attached to top member 12' of vibratory drive unit 15 via a number of fasteners 42. Vibratory bowl 52 includes a side wall 54 which extends downwardly below a bottom surface 56 of bowl 52 to form a flange 58. Fasteners 42 extend through flange 58 into top member 12' such that flange 58 is clamped between vertical side wall 12a' of top member 12' and fasteners 42.

Figure 3:
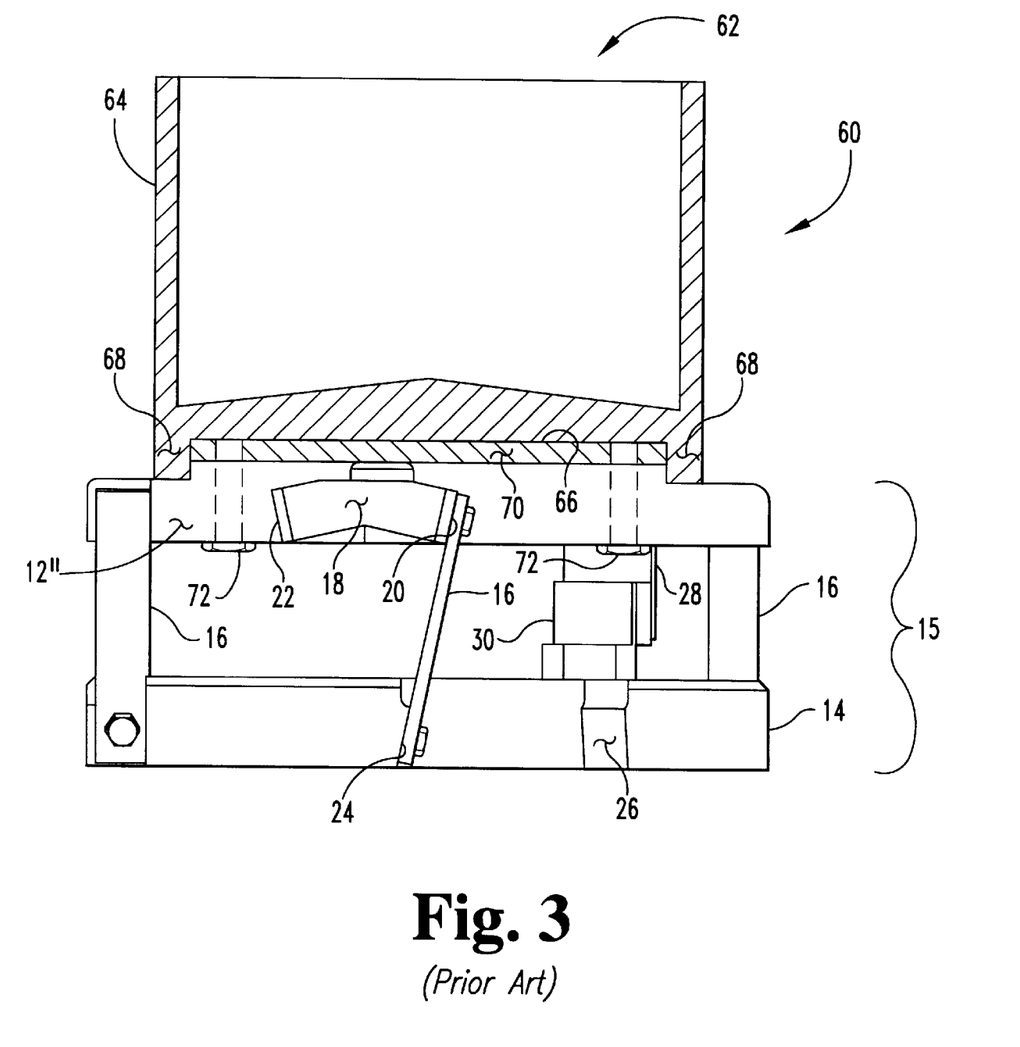
FIG. 3 is a front elevational view, in partial cross-section, of the vibratory drive unit of FIG. 1 showing yet another known technique for mounting a feeder bowl thereto.

Another known approach for attaching a feeder bowl to a vibratory drive unit is shown with respect to the vibratory parts feeder 60 of FIG. 3. Referring to FIG. 3, a vibratory bowl 62 is mounted to top member 12" of vibratory drive unit 15 via a number of fasteners 72. Vibratory bowl 62 includes a side wall 64 which extends downwardly below a bottom surface 66 of bowl 62 to form a flange portion 68. A plate 70 is attached to the bottom surface of bowl 62, typically via welding, and extends outwardly to flange portion 68. A number of fasteners 72 extend upwardly through top member 12" and into engagement with plate 70 to thereby attach bowl 62 to top member 12".

Figure 4:
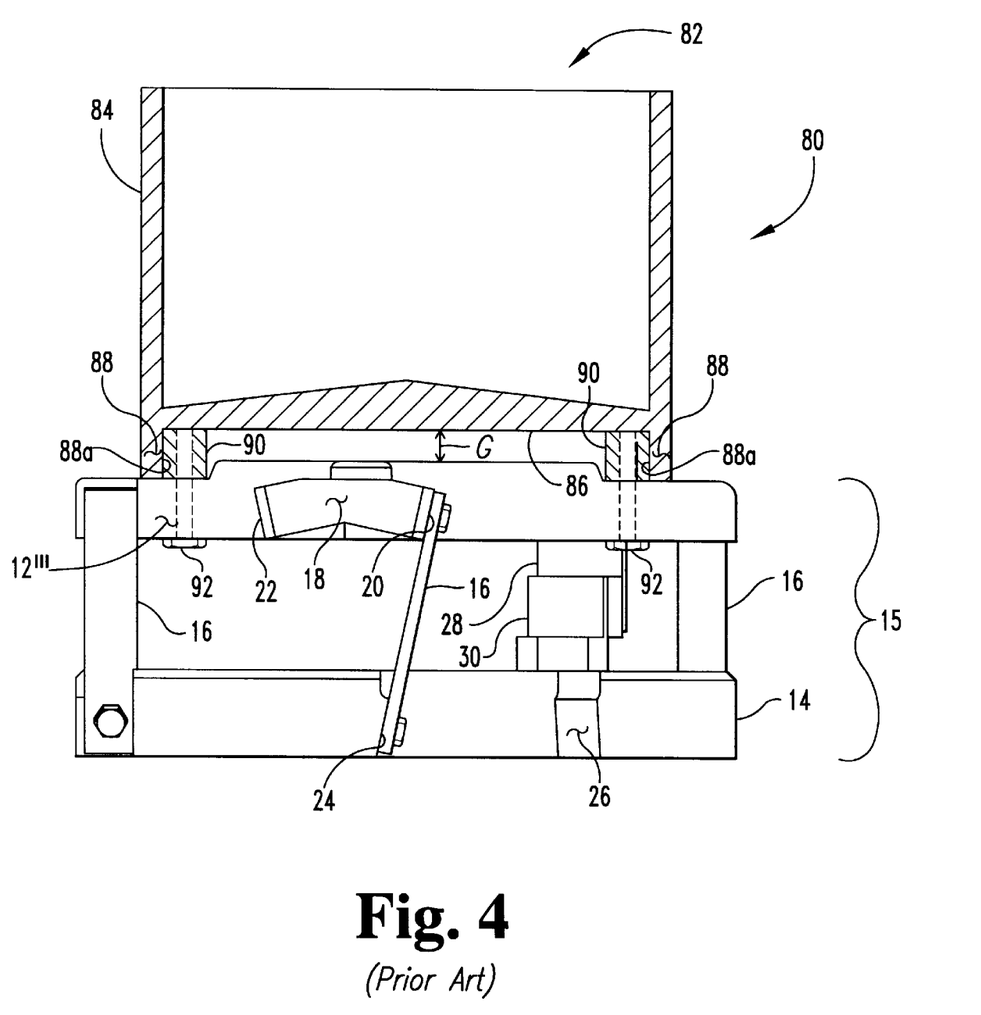
FIG. 4 is a front elevational view, in partial cross-section, of the vibratory drive unit of FIG. 1 showing still another known technique for mounting a feeder bowl thereto.

Still another known approach for attaching a feeder bowl to a vibratory drive unit is shown with respect to the vibratory parts feeder 80 of FIG. 4. Referring to FIG. 4, a feeder bowl 82 is mounted to a top member 12''' of vibratory drive unit 15 via a number of fasteners 92. Vibratory bowl 82 includes a side wall 84 extending below a bottom surface 86 of bowl 82 to form a flange portion 88. A number of lugs 90 are attached to the bottom surface 86 of bowl 82 and to a portion of inner surface 88a of flange portion 88 adjacent thereto. Vibratory bowl 82 is then mounted to vibratory drive unit 15 such that a gap G is defined between bottom bowl surface 86 and top member 12'''. A number of fasteners 92 extend upwardly through top member 12''' and engage lugs 90 to thereby secure vibratory bowl 82 to top member 12''' of vibratory drive unit 15.

While the foregoing techniques for mounting a feeder bowl to a vibratory drive unit have been used extensively in the past, each have drawbacks associated therewith, particularly when used with large feeder bowls and corresponding drive units (e.g., feeder bowls having diameters in excess of approximately 18 inches). For example, the clamp nut and flange mount techniques shown and described with respect to FIGS. 1 and 2 have a tendency to twist and eventually fracture the flange portion of the feeder bowl. The bottom plate structure of FIG. 3 alleviates this problem, but requires plate 70 to have substantial thickness to provide adequate engaging surfaces for engaging fasteners 72 in order to avoid stripping fasteners 72 during operation of the parts feeder. Unfortunately, increasing the thickness of plate 70 necessarily has the undesirable effect of increasing the weight of the vibratory bowl which then results in decreased drive efficiency. While the bowl mounting arrangement of FIG. 4 provides for such increased fastener engaging surfaces without substantially adding weight to the vibratory bowl, this approach reduces the rigidity of bowl 82 in the vicinity of the flange portion 88. Under the tremendous forces present in large vibratory parts feeders, the use of lugs 90 may deform or possibly fracture flange portion 88 within the vicinity of the various lugs 90 during operation of the vibratory parts feeder.

In view of the foregoing shortcomings of prior art vibratory drive units and feeder bowl mounting arrangements, there exists a need for improvement in such areas, particularly with large feeder bowls and corresponding drive units. An ideal vibratory drive unit should be suitably configured so that damage to one or more spring mounting faces does not require replacement of an entire top or bottom member. An ideal feeder bowl mounting arrangement should rigidly secure the feeder bowl to the top member of the vibratory drive unit against rotational forces in either rotational direction, and further against vertical forces due to lifting of the feeder bowl, and should be suitably robust to withstand the tremendous vibrational forces present in large feeder bowl and corresponding vibratory drive unit configurations.

SUMMARY OF THE INVENTION

The present invention overcomes the foregoing drawbacks associated with prior art vibratory parts feeders. In accordance with one aspect of the present invention a vibratory parts feeder comprises a feeder bowl defining a bottom outer surface and a bowl sidewall extending therefrom in a first direction to a bowl opening, a plurality of projections extending from the bottom outer surface in a second direction opposite to the first direction, a top member for mounting the feeder bowl thereto, wherein the top member defines a number of recesses within a top surface thereof, with at least some of the number of recesses configured to receive corresponding ones of the plurality of projections therein, and means for vibrating the top member. A fastener is engaged between each of the plurality of projections and the top member with each of the plurality of projections disposed within a corresponding one of the number of recesses.

In accordance with another aspect of the present invention, a-vibratory parts feeder comprises a top plate, a bottom plate, a plurality of upper spring mounting members detachably mounted to the top plate, a corresponding plurality of lower spring members detachably mounted to the bottom plate, a plurality of drive springs each detachably mounted to corresponding pairs of the upper and lower spring mounting members, and means for vibrating the top plate relative to the bottom plate against a force of the plurality of drive springs.

In accordance with a further aspect of the present invention, a vibratory parts feeder comprises a top plate, a plurality of upper spring mounting members each mountable to the top plate in either of a first position and a rotatably opposite second position, a bottom plate having a top surface and an opposite bottom surface, a corresponding plurality of lower spring mounting members each mountable to the bottom surface of the bottom plate in a first position and to the top surface of the bottom plate in a rotatably opposite second position, a plurality of drive springs each connected between a corresponding pair of the upper and lower spring mounting members, and means for vibrating the top plate relative to the bottom plate against a force of the plurality of drive springs in a first direction with the upper and lower spring mounting members mounted in their first position, and for vibrating the top plate relative to the bottom plate against a force of the plurality of drive springs in a second opposite direction with the upper and lower spring mounting members mounted in their second position.

One object of the present invention is to provide a vibratory drive unit constructed of modular drive unit components.

Another object of the present invention is to provide such a vibratory drive unit that is configurable for either clockwise or counter-clockwise operation utilizing identical drive unit components.

A further object of the present invention is to provide an improved technique for securely mounting a vibratory parts feeder bowl to a vibratory drive unit which maximizes the ability of such a system to withstand rotational and vertical forces present in the operation of large diameter feeder bowl and associated drive units.

These and other objects of the present invention will become more apparent from the following description of the preferred embodiments.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 5:
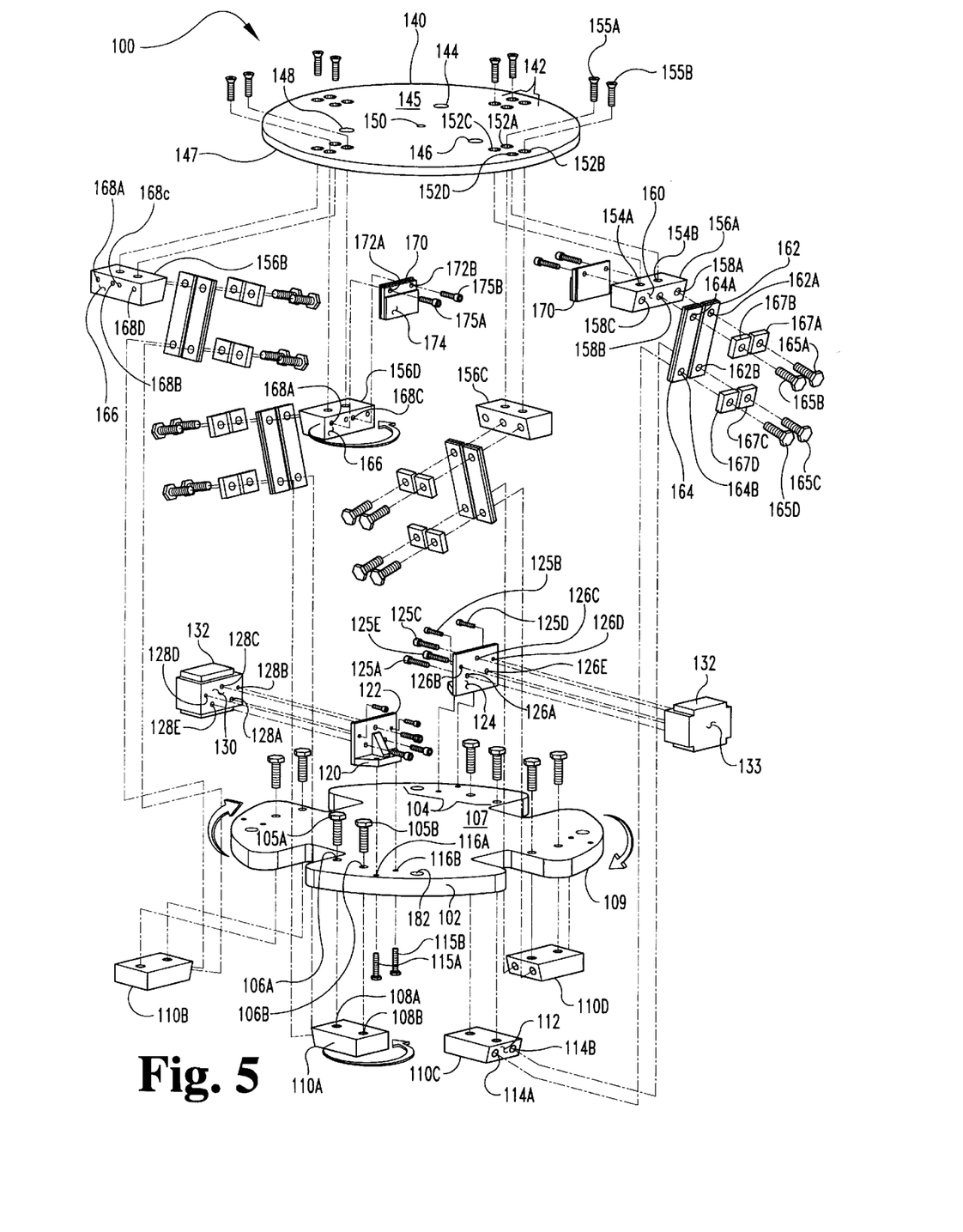
FIG. 5 is an assembly drawing of a vibratory drive unit in accordance with one embodiment of the present invention, configured for vibration in one direction.

Referring now to FIG. 5, an assembly drawing of one preferred embodiment of a vibratory drive unit 100, in accordance with one aspect of the present invention, is shown. Vibratory drive unit 100 includes a base member, or plate, 102 having a top surface 107 and an opposite bottom surface 109, wherein base member 102 defines a number of sets of bores 104 therethrough. Preferably, base member 102 includes four such sets of bores 104, although the present invention contemplates defining any number of sets of bores 104 through base member 102. Each set of bores 104 includes a pair of bores 106A and 106B through which fasteners 105A and 105B respectively extend, preferably from the top surface 107 of base member 102. Fasteners 105A and 105B are preferably threaded and may be headed as shown in FIG. 5 such that the head portions extend above top surface 107 of base member 102, or may alternatively be configured such that the head portions countersink within bores 106A and 106B when fasteners 105A and 105B extend fully therein.

Vibratory drive unit 100 further includes a number of lower spring mounting members corresponding to the number of pairs of bores 106A and 106B. In the embodiment shown in FIG. 5, drive unit 100 includes four such lower spring mounting members 110A–110D. Each lower spring mounting member 110A–110D defines a pair of bores 108A and 108B, preferably threaded, therethrough which align with bores 106A and 106B. Fasteners 105A and 105B preferably extend through bores 106A and 106B into engagement within bores 108A and 108B respectively to thereby detachably mount the lower spring members 110A–110D to the bottom surface 109 of base member 102. Alternatively, bores 106A and 106B may be threaded, and fasteners 105A and 105B may extend upwardly through bores 108A and 108B into engagement within bores 105A and 105B of base member 102. In any case, each lower spring mounting member 110A–110D defines a spring mounting face 112 which defines a pair of bores 114A and 114B therein. Preferably, the spring mounting face 112 of each of the lower spring mounting members 110A–110D forms an acute angle with respect to a plane defined by the top surface 107 of base member 102 when lower spring mounting members 110A–110D are detachably mounted thereto as just described. In one embodiment, such an acute angle is set at approximately 75 degrees.

Each of the sets of bores 104 defined within base member 102 further include a pair of bores 116A and 116B for receiving fasteners 115A and 115B, preferably threaded, therethrough, and preferably from the bottom surface 109 of base member 102. A number of driver support blocks 120 are provided, and each define a pair of bores therethrough which align with bores 116A and 116B. Preferably, the pair of bores defined within each driver support block 120 are threaded and engage with a corresponding fastener 115A or 115B to detachably mount the driver support block 120 to the top surface 107 of base member 102. Alternatively, bores 116A and 116B may be threaded, and fasteners 115A and 115B may extend downwardly through a driver support block 120 into engagement within bores 116A and 116B. In any case, two such driver support blocks 120 are preferably provided on opposing sides of base member 102, although the present invention contemplates providing any number of such driver support blocks 120 so long as the blocks 120 are radially spaced on top surface 107 equidistant from each other.

Each of the number of driver support blocks 120 include a plate 122 configured for attachment to a vibratory drive unit 132. In one embodiment, plate 122 defines a number of bores therethrough, preferably five 126A–126E, for receiving a corresponding number of fasteners 125A–125E, preferably threaded, therein. Each vibratory drive unit 132 includes a mounting face 130 which likewise defines a corresponding number of bores 128A–128E therein, wherein bores 128A–128E are preferably threaded. Fasteners 125A–125E extend through corresponding bores 126A–126B of plate 122 and into engagement within corresponding threaded bores 128A–128E of vibratory drive unit 132 to thereby detachably mount each vibratory drive unit 132 to the top surface 107 of base member 102.

Each vibratory drive unit 132 is preferably a known electromagnetic drive unit commonly used in the parts feeding and orienting industry, and is connected (not shown) to a source of electrical power for providing a driving force thereto, although the present invention contemplates providing vibratory drive unit 100 with alternative vibratory drive sources. A brief description of the operation of such vibratory drive units 132 will be provided hereinafter.

Figure 8:
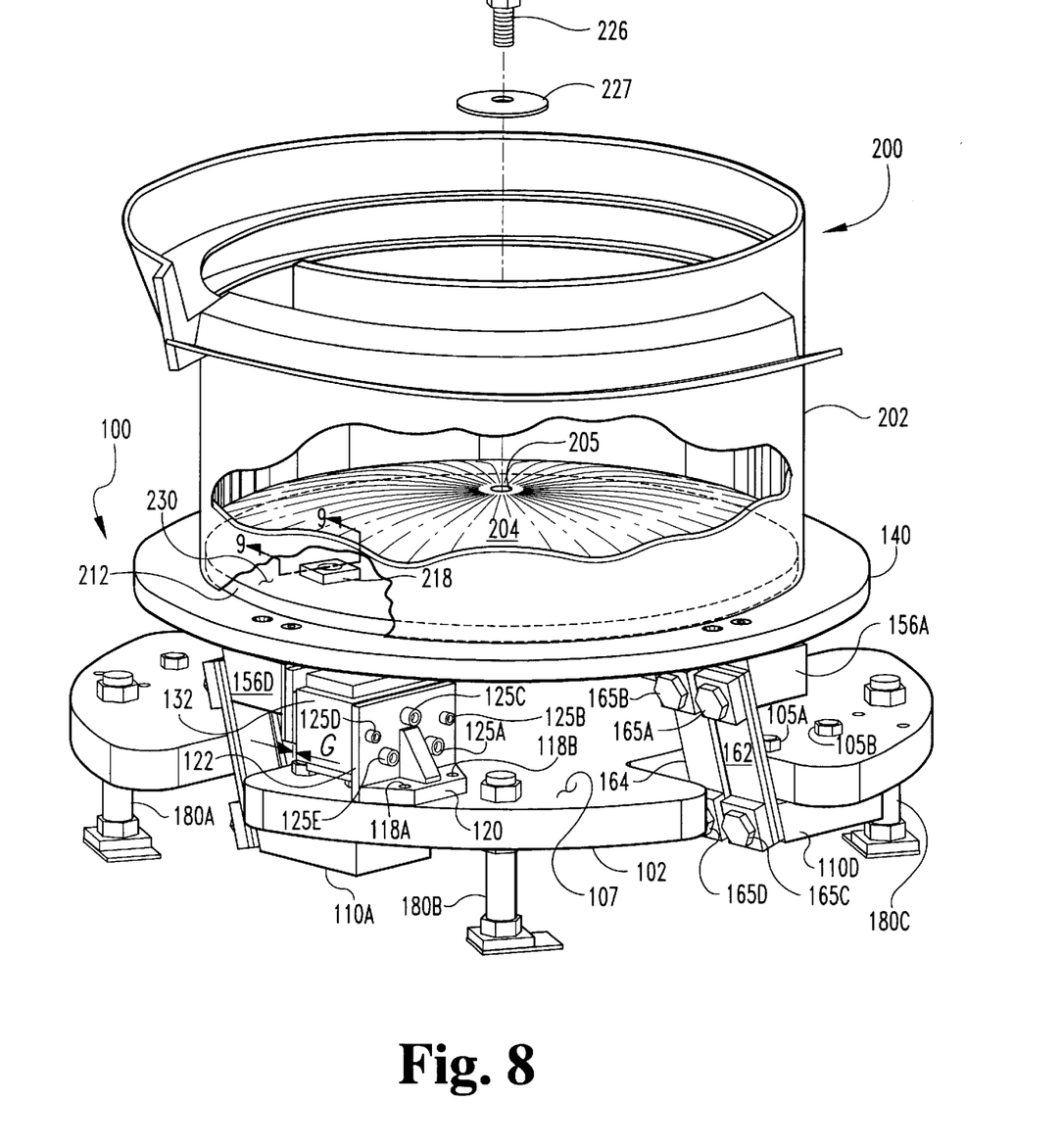
FIG. 8 is a perspective view of the vibratory drive unit of FIG. 5 as assembled.

As most clearly shown in FIGS. 5 and 8, each set of bores 104 defined within base member 102 include a bore 182 configured for detachably mounting a leg member 180, preferably threaded, therein. As is known in the art, leg members 180 are vertically adjustable within bores 182 to thereby provide for adjustability in the height of vibratory drive unit 100.

Vibratory drive unit 100 further includes a top member, or plate, 140 having a top surface 145 and an opposite bottom surface 147. Like base member 102, top member 140 defines a number of sets of bores 142 therethrough. Preferably, top member 140 includes four such sets of bores 142, although the present invention contemplates defining any number of sets of bores 142 through top member 140 so long as the number of sets of bores 142 corresponds to the number of sets of bores 104 defined through base member 102. Each set of bores 142 includes a pair of bores 152A and 152B, and a pair of bores 152C and 152D. A pair of fasteners 155A and 155B are further provided for each set of bores 142 and, in the configuration of vibratory drive unit illustrated in FIG. 5, extend through bores 152A and 152B respectively. Preferably, fasteners 155A and 155B are threaded and have headed portions configured to countersink within any of the bores 152A–152D so that the headed portions are either flush with, or extend below, the top surface 145 of top member 140 when the fasteners 155A and 155B fully extend into top member 140.

Figure 6:
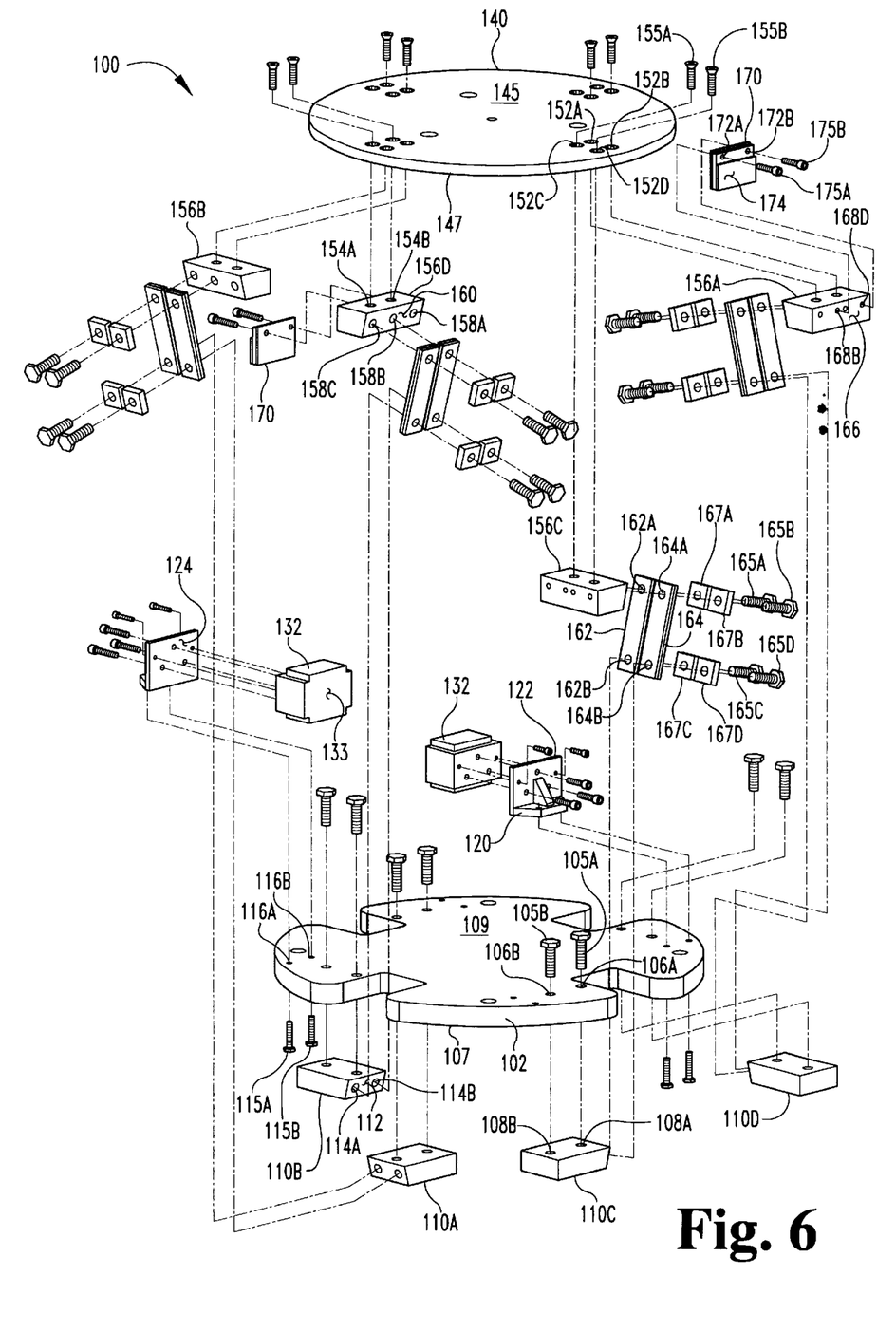
FIG. 6 is an assembly drawing of the vibratory drive unit of FIG. 5, configured for vibration in an opposite direction.

Top member 140 further defines a number of bores radially arranged inboard of the sets of bores 142. In one preferred embodiment, top member includes three such bores 144, 146 and 148, although the present invention contemplates providing more than three bores, the purpose of which will be more fully discussed hereinafter. In any case, the number of bores radially defined inboard of the number of sets of bores 142 are radially spaced equidistant from each other. Top member 140 further defines a central bore 150 therethrough, and in one preferred embodiment, bore 150 is threaded. vibratory drive unit 100 further includes a number of upper spring mounting members corresponding to the number of sets of bores 142. In the embodiment shown in FIG. 5, drive unit 100 includes four such upper spring mounting members 156A–156D. Each upper spring mounting member 156A–156D defines a pair of bores 154A and 154B, preferably threaded, therethrough which align with bores 152A and 152B (or bores 152C and 152D as illustrated in FIG. 6). Fasteners 155A and 155B preferably extend through bores 152A and 152B into engagement within bores 154A and 154B respectively to thereby detachably mount the upper spring members 156A–156D to the bottom surface 147 of top member 140. Alternatively, bores 152A and 152B may be threaded, and fasteners 155A and 155B may extend upwardly through bores 154A and 154B into engagement within bores 155A and 155B of top member 140. In any case, each upper spring mounting member 156A–156D defines a spring mounting face 160 which defines three bores 158A, 158B and 158C therein. Preferably, the spring mounting face 160 of each of the upper spring mounting members 156A–156D forms an acute angle with respect to a plane defined by the top surface 145 of top member 140 when upper spring mounting members 156A–156D are detachably mounted thereto as just described. The acute angle of spring mounting faces 160 should be identical with the acute angle of the spring mounting faces 112 of bottom spring mounting members 110A–110D, and in one embodiment, such an acute angle is set at approximately 75 degrees.

Each of the upper spring mounting members 156A–156D further includes an armature plate mounting face 166 generally opposite to the spring mounting face 160, wherein the armature plate mounting face 166 defines two sets of bores 168A and 168C, and 168B and 168D, therein. Preferably, bores 168A–168D are threaded. Vibratory drive unit 100 further includes a number of armature plates 170 corresponding to the number of vibratory driver units 132. The armature plates 170 each define a pair of bores 172A and 172 therethrough which align with either bores 168A and 168C, as illustrated in FIG. 5, or with bores 168B and 168D as illustrated in FIG. 6. A pair of fasteners 175A and 175B, preferably threaded, extend through bores 172A and 172B of each armature plate 170 and into engagement with bores 168A and 168C of a corresponding upper spring mounting block 156A and 156D. A gap G is thereby established between the armature faces 174 of the armature plates 170 and the corresponding driver faces 133 of vibratory driver units 132 as most clearly illustrated in FIGS. 5 and 8.

Vibratory drive unit 100 further includes a drive spring member detachably mounted between each spring mounting face 160 of upper spring mounting members 156A–156D and corresponding spring mounting face 112 of lower spring mounting members 110A–110D. In one preferred embodiment, each drive spring member includes a pair of drive springs 162 and 164, although the present invention contemplates providing each drive spring member with any number of drive springs. Each drive spring 162 defines a first bore 162A therethrough at one end thereof and a second bore 162B therethrough at an opposite end thereof. Similarly, each drive spring 164 defines a first bore 164A therethrough at one end thereof and a second bore 164B therethrough at an opposite end thereof. A pair of fasteners 165A and 165B, preferably threaded, extend through a corresponding pair of washers 167A and 167B into engagement within bores 158A and 158B respectively of upper spring mounting members 156A–156D. Similarly, a pair of fasteners 165C and 165D, preferably threaded, extend through a corresponding pair of washers 167C and 167D into engagement within bores 114B and 114A respectively of lower spring mounting members 110A–110D. An assembled view of the vibratory drive unit 100 of FIG. 5 is illustrated in FIG. 8.

It should now be appreciated that the vibratory drive unit 100 of the present invention is, to a large extent, constructed of modular components. As such, only parts thereof that typically break or degrade with operation need be replaced, thereby minimizing costs and material waste associated with prior art drive units as discussed in the BACKGROUND section.

In accordance with another aspect of the present invention, vibratory drive unit 100 is designed for bi-directional operation using exactly the same components for both operating directions. Such a capability minimizes both the inventory of vibratory drive unit parts needed for such bi-directional operation as well as the complexity and redundancy of upper and lower spring mounting faces as discussed with respect to prior art drive units in the BACKGROUND section. The assembly configuration of vibratory drive unit 100 for counter-clockwise operation is illustrated in FIG. 5, which has been fully discussed hereinabove, and the assembly configuration of vibratory drive unit 100 for clockwise operation is illustrated in FIG. 6. As shown in FIG. 5, re-configuration of vibratory drive unit 100 for alternate direction operation involves manipulation the base member 102, the lower spring mounting members 110A–110D and upper spring mounting members 156A–156D, as well as detachment and subsequent re-attachment of vibratory driver mount blocks 120, driver units 132 and armature plates 170, as well as the number of drive springs 162 and 164.

As most clearly illustrated by the various arrows depicted in FIG. 5, re-configuration of vibratory drive unit 100 from counter-clockwise operation to clockwise operation requires flipping base member 102 over so that the top surface 107 becomes the bottom surface and the bottom surface 109 becomes the top surface, and by horizontally rotating 180 degrees each of the lower and upper spring mounting members 110A–110D and 156A–156D. FIG. 6 illustrates the subsequent assembly of vibratory drive unit 100 for clockwise operation.

Referring now to FIG. 6, the rotated lower spring mounting members 110A–110D are detachably mounted to the now bottom surface 107 of base member 102 identically as described with respect to FIG. 5. Vibratory driver mount blocks 120 and vibratory drive units 132 are similarly detachably mounted as described hereinabove such that drive faces 133 of drive units 132 face the cut-out portions of base member 102.

The rotated upper spring mounting members 156A–156B are detachably mounted to the lower surface 147 of top member 140 as described with respect to FIG. 5, except that fasteners 155A and 155B now extend through bores 152C and 152D respectively of top member 140 and into engagement within corresponding bores 154A and 154B of the upper spring mounting members 156A–156D. Similarly, the armature plates 170 are detachably mounted to appropriate ones of the upper spring mounting members 156A–156D such that fasteners 175A and 175B now extend through bores 172A and 172B of the armature plates 170 into bores 168B and 168D respectively of the upper spring mounting members 156A–156D. Finally, the number of sets of drive springs 162 and 164 are detachably mounted to the lower spring mounting members 110A–110D as described with respect to FIG. 5, and the drive springs 162 and 164 are detachably mounted to the upper spring mounting members 156A–156D such that fasteners 165A and 165B extend through bores 162A and 164A of drive springs 162 and 164 respectively, into engagement within bores 158B and 158C of upper spring mounting members 156A–156D. Thus, by attaching the various modular components of vibratory drive unit 100 as illustrated in FIG. 6, the vibratory drive unit 100 is configured for clockwise operation.

Figure 7:
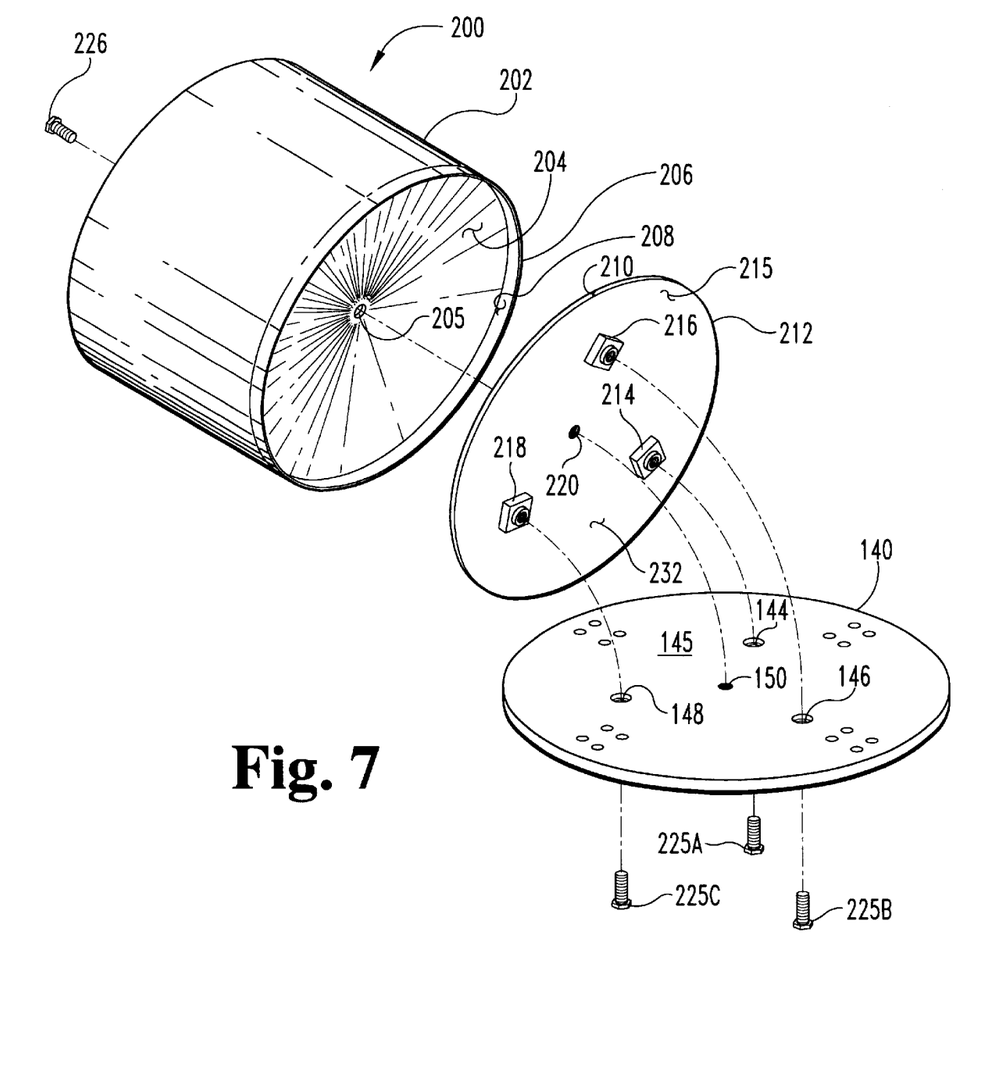
FIG. 7 is an assembly drawing illustrating a preferred technique for mounting a vibratory bowl to the vibratory drive unit of FIGS. 5–6, in accordance with another aspect of the present invention.
Figure 9:
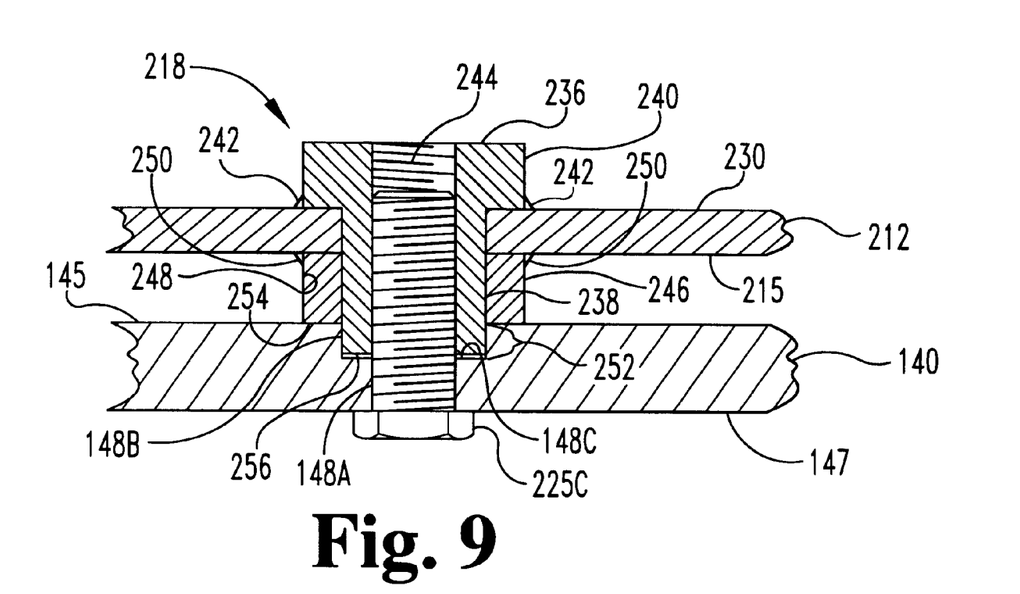
FIG. 9 is a cross-sectional view of the vibratory drive unit of FIG. 8, viewed along section lines 9—9 thereof.

Referring now to FIGS. 7–9, one preferred technique for mounting a vibratory bowl 200 to the vibratory drive unit 100 of the present invention is shown. Vibratory bowl 200 includes a sidewall 202 which extends upwardly to an open top and downwardly below bowl bottom 204 to form a flange 206. Preferably, bowl bottom 204 has a generally raised center portion defining a bore 205 centrally therethrough, wherein the raised center portion slopes downwardly toward bowl sidewall 202. A rigid plate 212 having a top surface 230 and an opposite bottom surface 232 is sized complementarily to the flange 206 of bowl 200 for attachment thereto. Preferably, plate 212 is sized such that an outer edge 210 thereof contacts an inner surface 208 of flange 206 as the top surface 230 is advanced toward bowl bottom 204. Plate 212 is attached to the inner surface 208 of flange 206 by suitable means such as welding.

Plate 212 defines a bore 220 centrally therethrough and includes a number of locator pins extending therethrough radially about bore 220 which align with the number of radial bores defined through the top member 140 of vibratory drive unit 100. The embodiment of FIGS. 5–8 illustrate three such radial bores 144, 146 and 148 defined through top member 140, so that three corresponding locator pins 214, 216 and 218 extend through plate 212. Structural details of the locator pins 214–218 as well as details relating to the attachment of plate 212 to top member 140 are most clearly illustrated in FIGS. 7, 8 and 9.

Referring to FIG. 7, locator pins 214, 216 and 218 are received within bores 144, 146 and 148 respectively of top member 140. Locator pins 214, 216 and 218 each define a bore therethrough, preferably threaded, which engage with fasteners 225A, 225B and 225C respectively extending upwardly through bores 144, 146 and 148. A fourth fastener 226, preferably threaded, extends downwardly through bores 205 and 220 into engagement with bore 150 of top member 140. Such a fourth fastener 226 is provided to prevent the bottom surface 205 of the vibratory bowl 200 from "oil-canning", as this term is commonly known in the art, with respect to top member 140 during operation of the vibratory drive unit 100.

FIG. 9 illustrates a cross-section of one of the locator pins 218 as viewed along section lines 9—9 of FIG. 8. Each of the locator pins 214, 216 and 218 are preferably identical in structure and include an upper pin member 236 and a lower pin member 246. Upper pin member 236 includes a flange portion 240 in contact with the top surface 230 of plate 212 and an elongated portion 238 extending through plate 212. Elongated portion 238 is preferably circular in cross-section and has a predefined outer diameter. Upper pin member 236 defines a bore 244, preferably threaded, therethrough for engaging a fastener 225C. Preferably, upper pin member 236 is attached to top surface 230 of plate 212 by suitable means 242, such as welding, to prevent upper pin member 236 from rotating relative to plate 212.

Lower pin member 246 may have any external shape, but preferably defines a cylindrical bore 248 therethrough sized for slidably receiving elongated portion 238 of upper pin member 236 therein. Lower pin member 246 is preferably attached to the bottom surface 232 of plate 212 by suitable means 250, such as welding, to prevent lower pin member 246 from rotating relative to plate 212. A portion 252 of elongated portion 238 of upper pin member 236 extends beyond a bottom surface 254 of lower pin member 246.

Bore 148 defined through top member 140, as with bores 144 and 146, includes a first bore 148A having a first diameter extending from a bottom surface 147 of top member 140 to top surface 145. A larger bore extends downwardly from top surface 145 of top member 140 and terminates at bore surface 148C to thereby form a recess around bore 148A. Preferably, bore 148B is sized to slidably receive portion 252 of upper pin member 236 therein such that bottom surface 256 thereof is disposed adjacent to bore surface 148C and bore 148A is aligned with bore 244. Thusly positioned, fastener 225C extends upwardly into bore 148A and into engagement within bore 244 of upper pin member 236.

From the foregoing, it should now be appreciated that the locator pin mounting arrangement of the present invention is operable to securely lock the vibratory bowl 200 to the vibratory drive unit 100. Such a multiple locator pin arrangement ensures that the vibratory bowl 200 and top member 140 become an integral unit to thereby withstand the tremendous vertical and rotational forces present in large diameter feeder bowls and associated drive units. The need for such secure engagement heightens as bowl diameters increase, particularly above approximately 18 inches. While a preferred embodiment illustrated in the FIGS. show the locator pin mounting arrangement of the present invention as having three (3) such locator pins, it is to be understood that the present invention contemplates utilizing more than three locator pins to mount a vibratory bowl to vibratory drive unit 100. For example, an alternate locator pin mounting arrangement utilizes four (4) such locator pins radially spaced equidistant from each other on plate 212, and located further outboard of the three locator pins 214–218 illustrated in FIG. 7.

Figure 10:
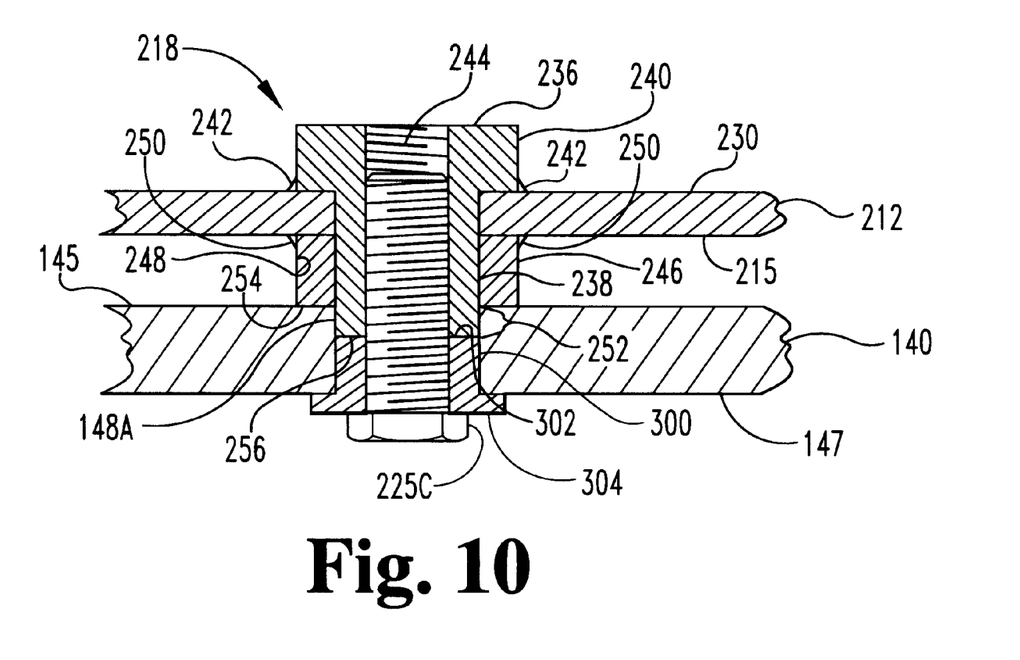
FIG. 10 is a cross-section view nearly identical to that of FIG. 9 showing an alternate embodiment of the locator pin mounting arrangement of the present invention.

Referring now to FIG. 10, an alternate embodiment of the locator pin structure of FIG. 9 is shown. FIG. 10 is identical in many respects to the cross-section of FIG. 9, and like reference numbers are therefore used to identify like elements. Unlike the embodiment shown in FIG. 9, however, the recess 148B defined in top surface 145 of top member 140 is replaced by a continuous bore 148A extending through top member 140 to the bottom surface 147 thereof. A retainer washer 300 is provided and has an outer diameter sized to be slidingly received within bore 148A. Retainer washer 300 has a top surface 302 that is disposed adjacent to the bottom surface 256 of upper pin member 236 when the retainer washer 300 is fully inserted into bore 148A. Attached to an opposite end of retainer washer 300 is flange portion 304 sized larger than bore 148A. Flange portion 304 becomes trapped between the bottom surface 147 of top member 140 and fastener 225C as the fastener 225C is advanced into bore 244, thereby securing the vibratory bowl 200 to top member 140.

The present invention is illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A vibratory parts feeder comprising:
    a feeder bowl defining a bottom outer surface and a bowl sidewall extending therefrom in a first direction to a bowl opening;

a plurality of projections extending from said bottom outer surface in a second direction opposite said first direction;

a top member for mounting said feeder bowl thereto, said top member defining a number of recesses within a top surface thereof, at least some of said number of recesses configured to receive corresponding ones of said plurality of projections therein;

a fastener engaged between each of said plurality of projections and said top member with each of said plurality of projections disposed within a corresponding one of said number of recesses; and means for vibrating said top member.

2. The vibratory parts feeder of claim 1 wherein each of said plurality of projections extend from said bottom outer surface approximately equidistant from each other in a radial pattern.

3. The vibratory parts feeder of claim 1 wherein said feeder bowl includes:

a bowl bottom having said bowl sidewall connected thereto, said bowl sidewall defining a first portion extending away from said bowl bottom in said first direction and a second portion extending away from said bowl bottom in said second direction; and a plate having a first surface facing said bowl bottom and an opposite second surface defining said bottom outer surface, said plate attached to said second portion of said bowl sidewall.

4. The vibratory parts feeder of claim 3 wherein each of said plurality of projections defines a bore therethrough having an inner surface configured for engaging a corresponding one of said fasteners.

5. The vibratory parts feeder of claim 4 wherein each of said plurality of projections extend through said second surface of said plate to said first surface thereof;

and wherein each of said plurality of projections is attached to both of said first and second surfaces of said plate.

6. The vibratory parts feeder of claim 5 wherein each of said number of recesses surrounds a bore extending through said top member, each of said fasteners extending through a corresponding one of said bores in said top member into engagement with said inner surface of a corresponding one of said plurality of projections to thereby secure said feeder bowl to said top member.

7. The vibratory parts feeder of claim 1 wherein each of said plurality of projections defines a bore therein having an inner surface configured for engaging a corresponding one of said fasteners.

8. The vibratory parts feeder of claim 7 wherein each of said number of recesses surrounds a bore extending through said top member, each of said fasteners extending through a corresponding one of said bores in said top member into engagement with an inner bore surface of a corresponding one of said plurality of projections to thereby secure said feeder bowl to said top member.

9. The vibratory parts feeder of claim 8 wherein said means for vibrating said top member includes:

a base member;

a plurality of drive springs connected between said top member and said base member; and means for vibrating said top member relative to said base member.

10. The vibratory parts feeder of claim 9 wherein said top member, said base member, said plurality of drive springs and said means for vibrating said top member relative to said base member are interconnectable to vibrate said feeder bowl in either of an upwardly clockwise direction and an upwardly counter-clockwise direction.

11. The vibratory parts feeder of claim 3 wherein said bowl bottom has a raised center portion extending toward said bowl opening, said raised center portion defining a first bore; and said plate defining a second bore, said second bore aligned with said first bore to receive a fastener therethrough to thereby secure said raised center portion to said plate.

12. The vibratory parts feeder of claim 3 wherein each of said plurality of projections has an upper member including:

a flange portion configured to abut said first surface of said plate; and an elongate portion sized to be received within a corresponding one of said recesses in said top member.

13. The vibratory parts feeder of claim 12 wherein each of said plurality of projections has a lower member including a flange portion configured to abut said second surface of said plate, said lower member defining a bore therethrough for receiving said elongate portion of said upper member therein.

14. The vibratory parts feeder of claim 13 wherein said upper member is operably attached to said first surface of said plate and said lower member is operably attached to said second surface of said plate.

15. The vibratory parts feeder of claim 13 further including a retaining member having an upper portion sized to be received within a lower portion of a corresponding one of said recesses, said retaining member defining a bore sized to receive said fastener therethrough, said upper portion configured to engage said elongate portion of said upper member in an abutting relationship.

16. The vibratory parts feeder of claim 4 wherein said bore defined in each of said plurality of projections is threaded.

17. A vibratory parts feeder comprising:

a feeder bowl defining a bottom outer surface;

a plurality of pins extending from said bottom outer surface;

a top member for mounting said feeder bowl thereto, said top member defining a number of openings extending from a top surface thereof, at least some of said number of openings sized to receive corresponding ones of said plurality of pins therein;

a fastener engaged between each of said plurality of pins and said top member with each of said plurality of pins disposed within a corresponding one of said number of openings; and a vibratory drive operably attached to said top member to vibrate said feeder bowl.

18. The vibratory parts feeder of claim 17 wherein each of said plurality of pins defines a first bore therethrough adapted to engage a corresponding one of said fasteners.

19. The vibratory parts feeder of claim 18 wherein said first bore defines an inner engaging surface, and wherein each of said number of said openings surrounds a corresponding second bore extending through said top member, each of said fasteners extending through a corresponding one of said second bores in said top member into engagement with said inner engaging surface of a corresponding one of said plurality of pins to thereby secure said feeder bowl to said top member.

20. The vibratory parts feeder of claim 17 wherein said feeder bowl includes:

a bottom wall and a side wall extending from said bottom wall in a first direction toward a bowl opening, said side wall having a portion extending downwardly beyond said bottom surface of said bottom wall to form a flange; and a plate having a first surface facing said bottom wall and an oppositely facing second surface defining said bottom outer surface, said plate operably attached to said flange.

21. A vibratory parts feeder comprising:

a feeder bowl defining a bottom outer surface;

a top member defining a number of recesses extending from a top surface thereof;

means for locating said feeder bowl in position relative to said top member, said locating means extending from said bottom outer surface of said feeder bowl and disposed within at least some of said number of recesses;

means for fastening said feeder bowl to said top member, said fastening means engagable between said locating means and said top member; and means for vibrating said top member.

* * * * *

UNITED STATES PATENT AND TRADEMARK OFFICE
CERTIFICATE OF CORRECTION

PATENT NO. : 5,988,359
DATED : November 23, 1999
INVENTOR(S) : S. Neal Graham

It is certified that error appears in the above-identified patent and that said Letters Patent is hereby corrected as shown below:

Column 3, line 57, after "invention, a", delete the hyphen.

Column 6, line 66, change "vibratory" to --Vibratory--.

Column 6, line 66, after "threaded.", insert a new paragraph.

Signed and Sealed this

Thirtieth Day of January, 2001

Attest:

Attesting Officer

Q. TODD DICKINSON

Director of Patents and Trademarks